Patented Mar. 12, 1935

1,994,378

UNITED STATES PATENT OFFICE 1,994,378

IRON-BEARING BRIQUETTE AND METHOD OF MAKING THE SAME

Clyde E. Williams and John D. Sullivan, Columbus, Ohio, assignors to The Battelle Memorial Institute, Columbus, Ohio, a corporation of Ohio No Drawing. Application March 17, 1933, Serial No. 661,415

11 Claims. (Cl. 75—48)

Our invention relates to iron-bearing briquettes and method of making the same. It is particularly applicable to the making of briquettes for use in open-hearth furnaces and in blast furnaces, though it is not necessarily limited thereto.

In the practice of manufacturing open-hearth steel, iron oxide in the form of lumps of iron ore is added to the charge for the purpose of reducing the carbon content of the steel. This iron ore usually comprises about 5% of the weight of the charge. Roughly, half of the iron ore is added with some fluxes to the bottom of the furnace before the metallic charge is introduced. The other half of the iron ore is added after the charge has become molten and there is a slag layer on top of the molten metal. In blast furnace practice, the iron ore is introduced at the top of the furnace and gradually works down into the smelting zone.

In both types of manufacture, attempts have been made to replace a portion of the iron ore by flue dust or mill scale for the purpose of utilizing waste or by-products. Usually, the flue dust or mill scale is sintered before introduction into the blast furnace. This sintered product is impracticable for open-hearth furnace because it is of insufficient density. Some effort has been made to bind the flue dust or mill scale together by the addition of ground slag or other inert material in order to facilitate the use thereof. However, the addition of inert material to the charge is obviously undesirable, since more flux is required and the slag burden is increased. Likewise, the binder used is frequently of such a nature that it becomes ineffective before the iron oxide has gravitated to the proper zone. This is frequently true whether the flue dust or mill scale is bound into the form of a briquette or into other lump form.

The use of flue dust as a part of the charge, however, has certain disadvantages arising from the inherent nature of this material. In the first place, it always carries certain undesirable impurities. Furthermore, it carries a comparatively small percentage of iron oxide.

One of the objects of this invention is to provide a method whereby mill scale or iron ore that is too fine for direct utilization may be used to form a part of the charge in open-hearth furnaces. More particularly, an object is to provide a binder for the mill scale or iron ore which will insure that this material, when introduced on top of the slag burden of the furnace will be of sufficient density to gravitate to the molten metal and will reach this molten metal without disintegration of the binder used.

Another object is to provide a method whereby mill scale, iron ore that is too fine for direct utilization, flue dust, or the like can be more economically prepared for use in blast furnaces.

Another object of this invention is to provide a binder which is of such a nature that it will not add materially to the slag burden in open-hearth furnaces and will, in fact, render assistance in the removal of undesirable impurities from the metal being converted into steel.

Another object of this invention is to provide a binder which may even be utilized advantageously in the binding of flue dust and similar by-products for use in blast furnaces and which, of course, may be used in the binding of iron ore, mill scale, and the like for blast furnaces.

Our invention when applied to the briquetting of mill scale, preferably contemplates the binding of such mill scale together by the use of a dolomite cement. This dolomite cement is a product which has been independently produced by us and which may be put to other uses. Its nature will be more fully described subsequently. In the performance of our method, the mill scale is mixed with the cement and with a sufficient quantity of water to render it hydraulic and to facilitate the proper packing of the mixture. The percentage of water added will depend upon the nature and character of the mill scale and the amount of cement combined therewith. In some compositions, from five to ten percent, by weight, of the cement is added and about ten to twelve percent, by weight, of water to the mill scale. The amount of water that can be used may vary over wide limits, and more or less than ten to twelve percent may be used. The amount of water required to give best results depends, to a certain extent, on the nature of the scale. We have found that some mill scales are dryer than others and some are more finely pulverized than others, and that these conditions require a larger amount of water.

The mixture is then thoroughly mixed in any suitable mixer. After proper mixing is attained, the mixture is preferably converted into briquettes. If these briquettes are to be used in an open-hearth furnace, it is desirable that they be produced by such a pressure that they will be given a density adequate to insure that the briquettes, when introduced on top of the slag burden, will gravitate downwardly therethrough to the molten metal and will reach this molten metal before disintegration occurs. If these briquettes are to be used in a blast furnace, where density is not so important, a much lower pressure may be used, though substantial pressure is desirable to avoid necessity for an excessive quantity of the binding material.

More specifically, the method which we use for producing mill scale briquettes preferably contemplates the use of such proportions of mill scale and cement that the dry briquette will embody about ninety to ninety-five percent, by weight, mill scale. In conjunction with this mill scale, we use a binder in the form of a hydraulic cement produced from a dolomite clinker and comprising from five to ten percent, by weight, of the mill scale. To this composition, we preferably add water, sufficient to set the cement and permit effective packing of the composition. This composition is thoroughly mixed in any suitable mixer and subjected to pressure, depending upon the use to which the briquettes are to be put, as indicated above.

The dolomite cement which we use in producing this composition is preferably produced by the use of natural dolomite or dolomitic limestone, it being desirable that the limestone be moderately high in magnesium. To this, we preferably add iron or aluminum oxide and silica. These ingredients are so proportioned to each other that they will render possible the production of a clinker which is stable, in that it is free from danger of slaking or dusting.

These ingredients are preferably first mixed and then ground to powdered form. This mixture is then burned at a temperature and for a period of time which will produce a clinker consisting essentially of periclase, tricalcium silicate, and calcium ferrite, or calcium aluminate, if alumina is used instead of iron oxide. The product is especially characterized by its high content of tricalcium silicate, its low content of dicalcium silicate, and its crystals of free periclase.

The amount of iron oxide and silica added as fluxes is important. Clinker containing incorrect amounts is unstable. By a stable clinker is ment one that will not slake or dust. Slaking is caused by the presence of free lime and dusting is caused by conversion of beta to gamma dicalcium silicate. This conversion takes place at about 675° C. during cooling of the clinker. Clinkers containing less than 5% of silica are unstable, owing to slaking. Clinkers containing over 8% to 12% of silica, the limit depending on the amount of iron oxide present, are unstable, owing to dusting. Between the slaking and the dusting fields lies the stable range of clinker. Thus any clinker made by using 5% to 8% of silica in the raw materials is stable, provided the iron oxide content, expressed as $Fe_2O_3$, is above 2%. The limits of amounts of silica and iron oxide to make stable clinker are broad enough to make manufacturing control easy and practicable. The percentage of flux added is based on the weight of raw materials used and not on the percentages in the burned clinker. Thus 7% of silica and 7% of ferric oxide as fluxes indicate that the raw materials consist of 86% of dolomite, 7% of silica, and 7% of ferric oxide.

The following compositions of raw materials yield satisfactory stable clinkers: 5% of silica and 3% to 15% of iron oxide, expressed as $Fe_2O_3$; 6% of silica and 1% to 15% of iron oxide; 7% of silica and .5% to 15% of iron oxide; 8% of silica and 0.5% to 10% of iron oxide; 9% of silica and 1% to 5% of iron oxide; 10% of silica and 1% to 3% of iron oxide; and 11% of silica and 2% of iron oxide. It is understood that it is not necessary to use integral percentages of silica and iron oxide. Fractional percentages can be used. It is also understood that equivalent amounts of aluminum or other oxides can be used to replace the iron oxide without appreciably changing the limits outlined. The clinkers containing 6% to 9% of silica and 2% to 5% of iron oxide are especially suitable. The above are given only as examples of combinations yielding stable clinkers and it is understood that our invention is not necessarily limited to these examples, since the invention covers the entire range of composition of dolomite, silica, and iron oxide or other acidic oxide that yields stable clinker. Stable clinker is characterized by nearly all the silica being present as tricalcium silicate and enough iron or aluminum being present to stabilize the beta dicalcium silicate.

The temperature utilized and the time of application thereof which are necessary to produce a stable clinker which will be substantially free from slaking or dusting may vary somewhat, depending upon the ingredients of the mixture. Preferably, this mixture should be subjected to a temperature of 2700° F. and it is desirable that this temperature be maintained for an hour or more, though the addition of soda ash to the mixture may permit of a slightly lower temperature or a shorter period of time or both. It is sometimes advantageous to employ temperatures of 2900° F. or higher. In any event, the temperature should be sufficiently high and applied for sufficient length of time to insure that there will be produced a clinker comprised essentially of tricalcium silicate, calcium ferrite or aluminate and periclase.

As stated above, the pressure used in making the briquettes may vary considerably. We have successfully made briquettes in a brick press, employing a pressure of about 6000 pounds per square inch. With such a pressure, we have been able to produce mill scale briquettes having a density greater than 3.8. Obviously, the density may vary with the nature and kind of the scale or other material used and, also, with the pressure applied. To facilitate handling without breakage, we prefer to produce pillow-shaped briquettes. Obviously, the size and shape of the briquettes may vary.

The use of dolomite cement is especially desirable as a binding agent, since the cement consists essentially of magnesium oxide and tricalcium silicate. Tricalcium silicate is capable of uniting chemically with silica to form less basic calcium silicates, so it is, itself, a flux. Since calcium or magnesium oxide or both are used as fluxes in the open-hearth process, the use of dolomite cement adds very little inert material to the charge and does not increase the slag burden very much. If dolomite cement is used as the binder, it is desirable to keep the briquettes moist for a period of time, preferably at least 48 hours, to allow the cement to set. The briquettes may then be dried and charged directly into the furnace.

It will be understood that iron ore or flue dust may be similarly formed into briquettes by the use of our dolomite cement. However, the proportionate amount of the binder will vary somewhat, depending upon the inherent density of the iron ore or the flue dust and the impurities which they contain. Likewise, as previously pointed out, the degree of pressure used in forming briquettes will vary in accordance with the uses to which they are to be put.

In the production of briquettes for use in open-hearth furnaces, density is an important factor. Our invention contemplates the use of other binders than dolomite cement, though some binders do not possess physical properties which render them desirable requiring, in some cases, such large quantities of binder as to seriously detract from the density of the product or, in other cases containing undesirable inert material.

Under certain conditions, our mill scale briquettes may be made by using Portland cement as a binder. Under these conditions, the Portland cement preferably comprises from five to ten percent, by weight, of the mill scale. As in the case of such briquettes made with dolomite cement, it is desirable that the briquettes be kept moist for a period of time, preferably at least twenty-four hours, to allow the cement to set. These briquettes should be permitted to dry before use.

We may also produce our mill scale briquettes by using plastic clay, in amounts from five to ten percent, as a binder. When such clay is used, it is desirable that the briquettes be permitted to air-dry after being made.

It will also be understood that we may utilize mixtures of any two or more of the binders in making our briquettes. Likewise, we can use more than ten percent of binder in making the briquettes, though we prefer not to do so, particularly if the briquettes are to be used in the open-hearth process. It will also be understood that we can obtain briquettes with a density as high as that obtained with dolomite cement by use of Portland cement or clay as binders or by the utilization of both together or with dolomite cement added to either Portland cement or clay or to both.

It will be seen from this that we have provided a novel and important method of rendering mill scale available as a substitute for a portion of the ore which is normally required to make up the charge either of an open-hearth furnace or of a blast furnace. Mill scale is essentially an oxide of iron, approximating in chemical composition the magnetic oxide of iron, $Fe_3O_4$. It is usually formed in thin pieces or flakes and is bulky in nature. This is especially true of rolling mill scale. Owing to the low specific gravity of this material, it cannot be effectively introduced into open-hearth furnaces or blast furnaces in its natural state.

Some effort has been made to bind it together to facilitate introduction into furnaces of the type indicated. These efforts have usually involved reliance upon a slag binder or a combination of slag and Portland cement or of lime and slag. These binders are of such a nature that they unduly add to the slag burden in an open-hearth furnace and, further, in the amounts usually added, the density of the material sought to be introduced is not sufficiently high.

Our process and product possesses numerous advantages. In the first place, we utilize the mill scale with its high iron oxide content and with its minimum amount of impurities. In the second place, by the use of our dolomite cement as a binder, we render possible the substitution of the mill scale for a portion of the charge and, since our mill scale briquettes normally have about seventy percent iron in them, it becomes possible to use a lower grade iron ore in conjunction with these mill scale briquettes, while at the same time maintaining the average iron content of the total charge high enough to satisfy the usual blast furnace requirement.

In open-hearth practice, our product, when we use dolomite cement, has the further advantage of furnishing a fluxing material as a part of the briquettes, which makes possible the reduction of the amount of flux initially introduced into the furnace. At the same time, we are enabled to introduce the mill scale into the furnace without increasing the slag burden which would inevitably result in additional costs for flux and for disposal of the slag. Likewise, by the reduction of the amount of slag, the amount of iron lost in this slag is decreased. In addition, the fluxes which form a part of our briquettes absorb a proportion of the impurities which are found in the materials normally used for the production of steel in open-hearth furnaces.

While the advantages of using mill scale have been somewhat stressed in the above description, the use of iron ore in the production of our briquettes is likewise important. The recent tendency towards the use of concentration methods for the beneficiation of iron ores has resulted in the increased production of material finer in state of subdivision than lump ore which until recent times has been the only kind shipped from the mines. This fine iron ore, in its natural condition, is unsuitable for use either in the open-hearth or blast furnaces. However, when embodied in briquette form in accordance with our method, it may be effectively used both in open-hearth furnaces and in blast furnaces. The peculiar effectiveness of dolomite cement, in itself, permits of the formation of briquettes wherein the binder is a comparatively small proportion of the briquette. Furthermore, the formation of the briquette by pressure, as indicated, not only enhances this desirable condition but makes readily possible the use of Portland cement or clay as a binder or the use of any two or all of the described materials as an effective binder. Thus, we are able, by the use of the binders described in accordance with our method, to utilize effectively fine iron ore both in open-hearth and blast furnaces.

In the foregoing specification and claims following, the term "iron-bearing briquette" refers to one made from mill scale, flue dust, iron ore, or like forms of iron compounds.

The term "mill scale" as used in the foregoing specification and appended claims is to be understood to mean the coating of iron oxide which forms on the surface of the metal when heated and which is cracked and broken off after its formation. As used in this application, it is intended to include such forms of scale as roll scale, hammer scale, furnace scale from annealing, normalizing, and sundry operations, soaking pit scale, and the like.

The term "dolomite cement" as used in the description and claims refers to the hydraulic product obtained by reducing to powdered form a stable clinker made by firing a proper mixture of dolomite, silica, and iron oxide or aluminum oxide at such a temperature and for such a period of time as to produce a clinker consisting essentially of periclase, tricalcium silicate, and calcium ferrite or calcium aluminate, and containing sufficient of either of the aforesaid metal oxides to stabilize any beta dicalcium silicate that may be present.

Having thus described our invention, what we claim is:

1. An iron bearing briquette comprising an iron containing material selected from the group comprising mill scale, flue dust, iron ore, and a binder comprising dolomitic cement for binding said material together into a unitary mass.

2. An iron bearing briquette comprising an iron containing material selected from the group comprising mill scale, flue dust, iron ore, and a binder comprising dolomitic cement for binding said material together into a unitary mass, said briquette having a density such as to insure its gravitation through the slag burden to the metal bath of an open hearth furnace.

3. An iron bearing briquette comprising iron ore, and a binder comprising dolomitic cement for binding said iron ore into a unitary mass.

4. An iron bearing briquette comprising mill scale, and a binder comprising dolomitic cement for binding said mill scale together into a unitary mass.

5. An iron bearing briquette comprising mill scale, and a binder comprising dolomitic cement for binding said mill scale together into a unitary mass, said mill scale and cement being formed into a briquette under pressure.

6. An iron bearing briquette for open hearth furnaces comprising mill scale, and a binder comprising dolomitic cement for binding said material together into a unitary mass, said mill scale and binder being so proportioned and said mass being so compressed that it has a density sufficient to insure its gravitation through the slag burden to the metal bath.

7. An iron bearing briquette comprising an iron containing material selected from the group comprising mill scale, flue dust, iron ore, and a binder comprising from five to ten per cent of dolomitic cement for binding said material together into a unitary mass.

8. The method of making an iron bearing briquette which comprises mixing an iron containing material selected from the group comprising mill scale, flue dust, iron ore, and a binder comprising dolomitic cement together with sufficient water, subjecting said materials to pressure sufficient to form a unitary mass, and drying the thus formed briquette.

9. The method of making an iron bearing briquette which comprises mixing an iron containing material selected from the group comprising mill scale, flue dust, iron ore, and a binder comprising dolomitic cement together with sufficient water, subjecting said materials to pressure sufficient to form a unitary mass which in final form has a density such as to gravitate through the slag burden to the metal bath of an open hearth furnace, and drying the thus formed briquette.

10. The method of making an iron bearing briquette which comprises mixing a magnesium calcium carbonate material, silica, and an oxide of a metal selected from the group of metals comprising iron, aluminum, heating such mixture to produce a stable clinker comprising essentially tricalcium silicate, periclase, and calcium ferrite or aluminate, reducing to powdered form to product a hydraulic cement, and mixing therewith an iron containing material selected from the group comprising mill scale, flue dust, or iron ore, and with water to form a unitary mass.

11. The method of making an iron bearing briquette which comprises mixing a magnesium calcium carbonate material, silica, and an oxide of a metal selected from the group of metals comprising iron, aluminum, heating such mixture, the proportion of ingredients and degree and time of application of heat being such as to produce a stable clinker comprising essentially tricalcium silicate, periclase, and calcium ferrite or aluminate, reducing to powdered form to produce a hydraulic cement, mixing therewith an iron containing material selected from the group comprising mill scale, flue dust, or iron ore, and with water to form a unitary mass, and subjecting said last named mixture to pressure to form a condensed unitary mass.

CLYDE E. WILLIAMS.
JOHN D. SULLIVAN.